(12) United States Patent
Croak et al.

(10) Patent No.: US 8,199,744 B2
(45) Date of Patent: *Jun. 12, 2012

(54) METHOD AND APPARATUS FOR AUTOMATED CALENDAR SELECTIONS

(75) Inventors: Marian Croak, Fair Haven, NJ (US);
Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 974 days.

This patent is subject to a terminal disclaimer.

(21) Appl. No.: 12/190,570

(22) Filed: Aug. 12, 2008

(65) Prior Publication Data

US 2008/0298350 A1    Dec. 4, 2008

Related U.S. Application Data

(63) Continuation of application No. 11/288,615, filed on Nov. 29, 2005, now Pat. No. 7,411,942.

(51) Int. Cl.
*H04L 22/66* (2006.01)
(52) U.S. Cl. ............... 370/352; 370/353; 379/93.09
(58) Field of Classification Search .......... 370/352–356; 379/15.02, 88.22, 88.25, 100.15, 157, 165; 705/8

See application file for complete search history.

(56) References Cited

U.S. PATENT DOCUMENTS

| | | | |
|---|---|---|---|
| 6,968,367 | B1 | 11/2005 | Vassar et al. |
| 7,139,263 | B2 | 11/2006 | Miller et al. |
| 7,411,942 | B1 | 8/2008 | Croak et al. |
| 2006/0036478 | A1 | 2/2006 | Aleynikov et al. |

*Primary Examiner* — Suhan Ni

(57) ABSTRACT

A method and apparatus for reserving an appointment in a communications network is described. In one embodiment, a request is received from a caller to schedule an appointment with an enterprise customer, wherein the request is processed in accordance with a media server in the communications network. A scheduling calendar is then accessed. Afterwards, the appointment is reserved with one of a plurality available appointment time slots.

20 Claims, 4 Drawing Sheets

METHOD AND APPARATUS FOR AUTOMATED CALENDAR SELECTIONS

CROSS-REFERENCE TO RELATED APPLICATIONS

This application is a continuation of U.S. patent application Ser. No. 11/288,615 filed Nov. 29, 2005, now U.S. Pat. No. 7,411,942 B1, issued Aug. 12, 2008, which is incorporated herein by reference in its entirety.

BACKGROUND OF THE INVENTION

1. Field of the Invention

Embodiments of the present invention generally relate to telecommunications systems and, more particularly, to a method and apparatus for scheduling an appointment in a communications network, such as a packet network, e.g., a voice over internet protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

Small to mid-sized business owners are increasingly employing packet networks, e.g., VoIP networks, to utilize alternative business class telephony applications, such as IP Centrex. At present, however, enterprise customers are not able to designate call treatment preferences that can be configured into service logic that processes incoming calls for handling appointment scheduling.

Thus, there is a need in the art for a method and apparatus that enables and enterprise owner to define incoming call service logic for handling appointment scheduling.

SUMMARY OF THE INVENTION

In one embodiment, a method and apparatus for reserving an appointment in a communications network are described. Specifically, a request is received from a caller to schedule an appointment with an enterprise customer, wherein the request is processed in accordance with a media server in the communications network. A scheduling calendar is then accessed. Afterwards, the appointment is reserved with one of a plurality of available appointment time slots.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
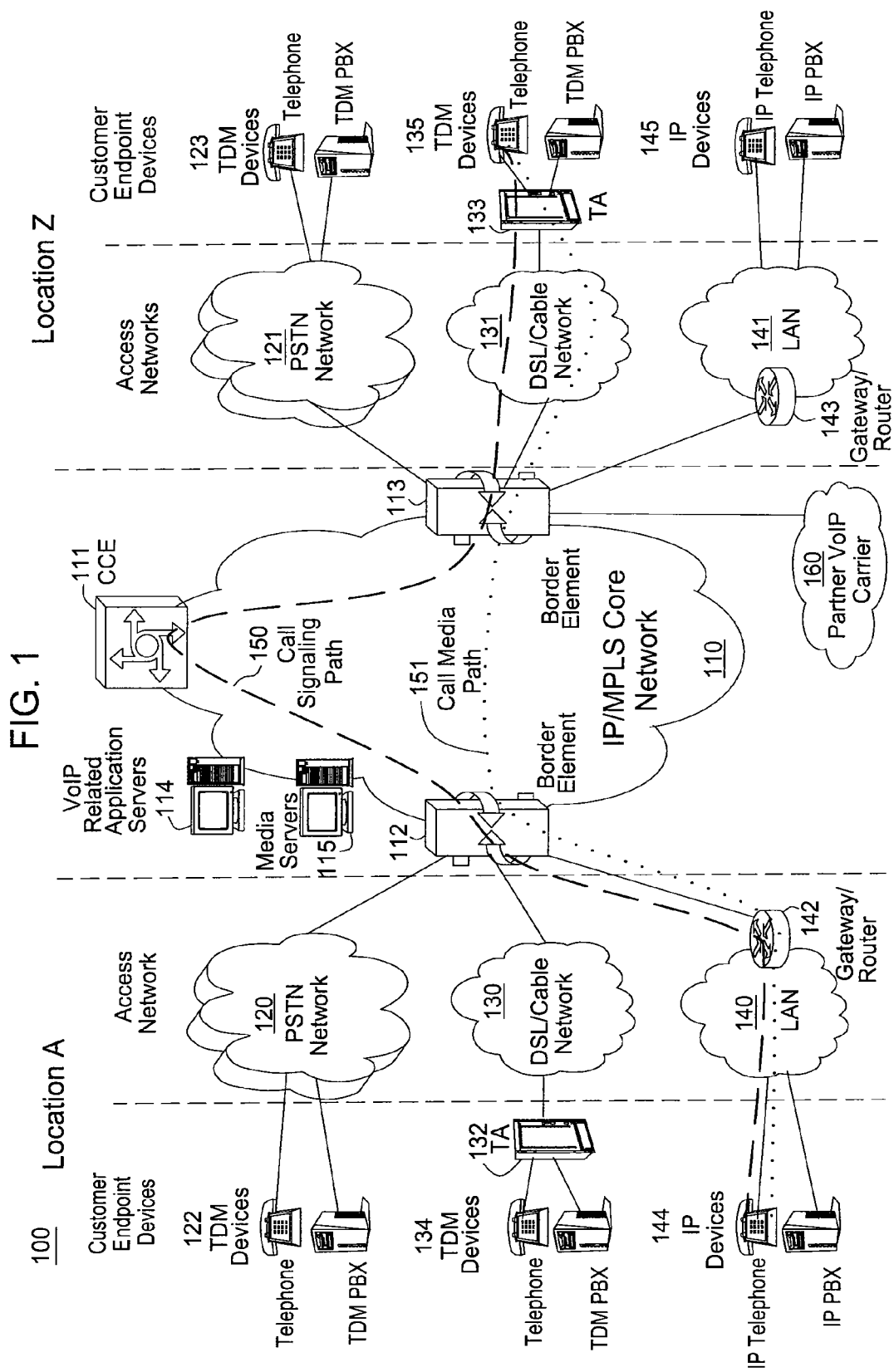
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
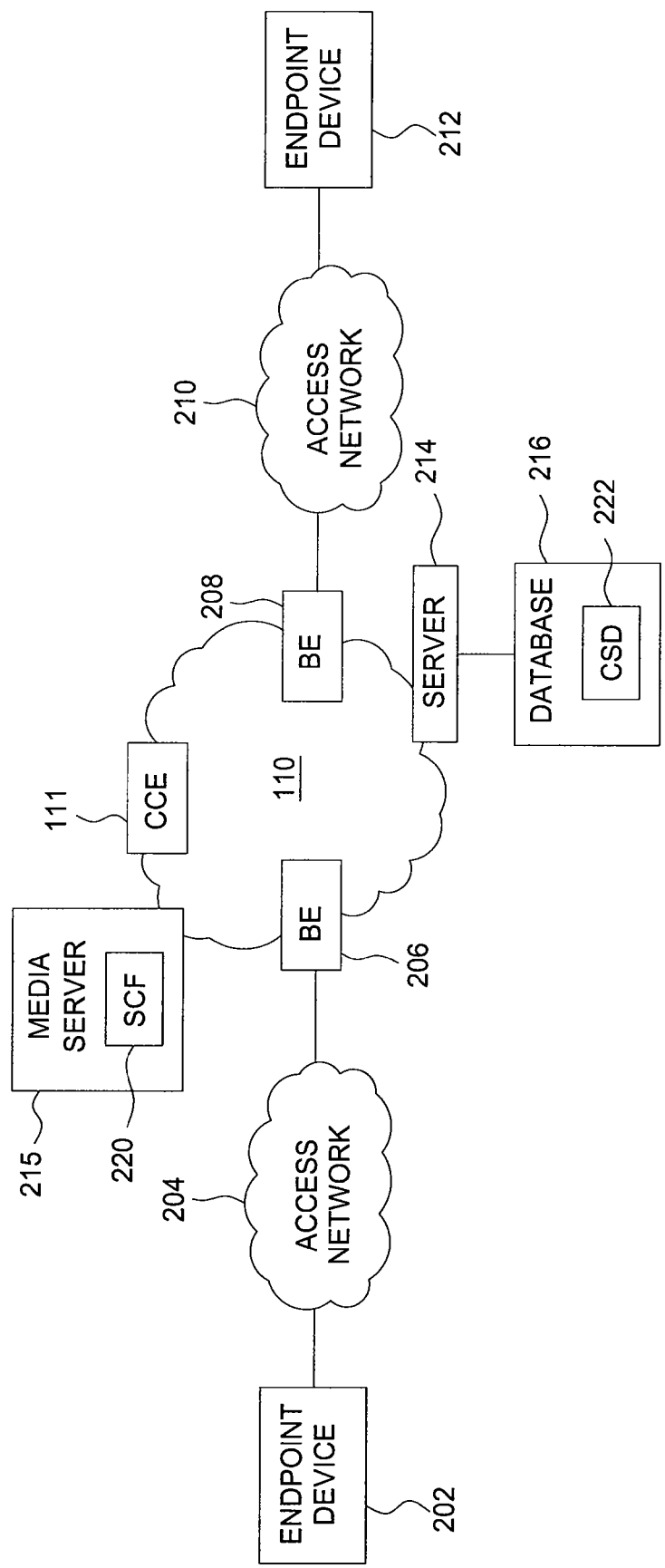
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and at least one border element (BE) 206. An endpoint device 212 is configured for communication with the core network 110 via an access network 210 and at least one BE 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc). The core network 110 also comprises a media server 215. The media server 215 is responsible for supporting various interactive functions, such as receiving input commands (e.g., DTMF tones, voice commands, etc.) from the user and providing prerecorded messages, menu options, and scripts in response to the input commands.

The core network 110 further includes a server 214 in communication with a database 216. In one embodiment of the present invention, the server 214 comprises a dedicated application server that is configured to receive instructions that define the processing procedures for incoming calls directed to the business of an enterprise customer. The server 214 is also responsible for generating service logic that is representative of the received instructions. Although FIG. 2 depicts the media server 215 and the application server 214 as separate servers, those skilled in the art will realize that their respective functions may be handled by a single server. The database 216 may be any type of electronic collection of data that is well known in the art. In one embodiment, the database 216 may be a common storage volume configured to store data pertaining to calling customers of the business enterprise. For example, the database 216 may store data that the customer can obtain (e.g., account information) or data that the customer provides (e.g., updated contact information).

In the present invention, a network provider offers business class telephony services (e.g., IP Centrex) to enterprise customers. The network provider uses an application server 214 that is configured to support and modify the requisite service logic for handling calls for one or more businesses. Notably, the network provider offers subscribing enterprise customers the ability to specify preferences that may be converted into service logic that defines the processing of incoming calls. For example, the application server 214 (per the instructions of an enterprise customer) may generate the service logic that enables calls to be routed to designated endpoints (e.g., voicemail accounts, pagers, human agents, cellular phones, interactive voice response (IVR) menus, etc.) depending on certain calling conditions.

In one embodiment, a subscribing enterprise customer may contact the application server 214 and designate specific handling instructions and procedures for the treatment of incoming business calls. The application server 214 may be provided with instructions by the enterprise customer via a web portal, a phone keypad, or other mechanism. In response, the application server 214 generates the representative service logic (e.g., converts instructions into service logic) that will handle or route subsequent incoming calls. The manner in which the incoming calls are processed may be based on conditions including, but not limited to, the calling party's number, the time of day, the day of the week, and the like. For instance, if a business owner (i.e., the enterprise customer) is expecting an important call from a certain entity (e.g., a customer, a vendor, a client, a patient, etc.), the application server 214 may be instructed to create service logic that will have the call directly routed to a designated endpoint device, such as the business owner's cellular phone (or any other endpoint device where the owner can be reached). Similarly, the business owner may instruct that other calls may be directed to voicemail, or alternatively, provided with a certain message depending on the time and/or day of the week (e.g., during lunch hour or the weekend). In another embodiment, callers may also be provided with a menu of options that can be utilized to further service the call. For example, the media server 215 may be employed to enable callers to use an IVR menu that can record customer messages, receive customer data, or provide customer data.

The present invention may be implemented in a number of business environments, such as a physician's office. In an exemplary scenario, a sole medical practitioner may decide that it would be beneficial to utilize the present invention as opposed to implementing an on-site telephony server that only services the physician's office. Instead, the physician may subscribe to business telephony services that are supported by a network media server 215 (whose functionalities are extended to the physician's office space). For example, when a call is directed to the physician's office, the call is intercepted by the media server 215 that provides various options to the caller. These options may include routing preferences designated by the physician (in a manner as described above) that transfer the call to specified endpoints depending on the caller's identity or the nature of the call. For example, an IVR application utilized by the media server 215 may request the caller to press a key (or state a number) to indicate whether the caller is (1) another physician, (2) a pharmacist, (3) a patient, (4) an insurance company representative, and the like. The media server 215 in the core network then processes the caller's input and routes the call to the designated endpoint at the physician's office (e.g., the physician's pager, the physician's cellular phone, a voicemail account, a receptionist, and the like). In addition, the media server 215 will route calls in accordance with any "time-related" service logic that was originally designated by the enterprise customer (e.g. special routing instructions for calls received during a lunch hour, after business hours, or on a weekend).

Similarly, the enterprise customer may utilize the off-site media server 215 for scheduling appointments. Notably, the enterprise customer may provide instructions for scheduling appointments that is then converted into service logic. Other than requiring scheduling calendar data 222 from the enterprise customer, the present invention functions in a similar method described above.

By using the present invention, the service provider enables callers who indicate the need to make appointments with the enterprise customer to be processed by an automated scheduling calendar function 220. In one embodiment, the media server 215 supports a calendar function 220 that comprises a software application for accessing calendar scheduling data 222 and scheduling appointments. For example, after the caller selects an "appointment-making" option, a calendaring function 220 subsequently contacts the application server 214 and accesses a database 216 that contains the predefined calendar scheduling data 222 associated with the "called" enterprise customer. The calendar scheduling data 222 comprises a plurality of scheduling calendars that have been previously entered by a number of enterprise customers. In one embodiment, the calendar scheduling data may be entered and updated using a web portal, a keypad, or another like mechanism. The number of scheduling calendars provided by an enterprise customer may vary. Notably, if the enterprise customer consists of a single entity (e.g., a sole medical practitioner), then the database 216 only contains one calendar schedule for the enterprise customer. Conversely, if the enterprise customer is a larger entity (e.g., a law firm with a plurality of attorneys), then a plurality of calendar schedules may be associated with the enterprise customer.

After obtaining the appropriate electronic scheduling calendar information from the database, the media server 215 subsequently provides the caller with available appointment slots from the scheduling calendar using a text-to-speech function, such as an IVR application. In another embodiment, the media server 215 may prompt the caller to submit possible dates and times. Depending on the embodiment, the caller may submit, select, and reserve calendar entries for appointments by using voice commands which are processed by the media server's voice recognition technology, or alternatively, by utilizing the phone keypad to produce dual tone multi-frequency (DTMF) codes.

Figure 3:
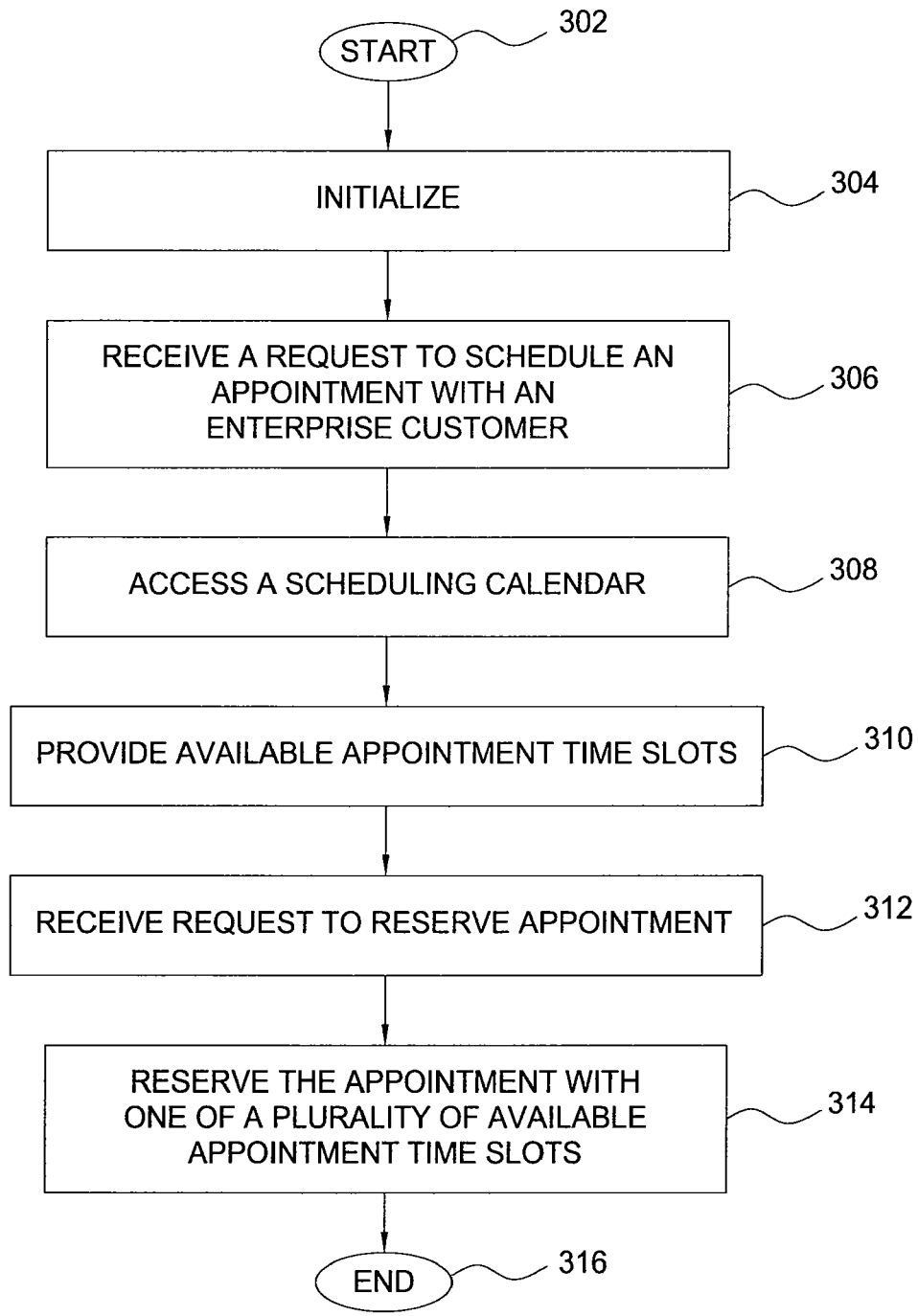
FIG. 3 is a flow diagram depicting an exemplary embodiment of a method for scheduling an appointment in accordance with one or more aspects of the invention.

FIG. 3 is a flow diagram depicting an exemplary embodiment of a method 300 for scheduling an appointment in a communications network as related to one or more aspects of the invention. The method 300 begins at step 302 and proceeds to step 304 where an initialization process takes place. In one embodiment, the initialization process comprises receiving an instruction from an enterprise customer that defines processing procedure(s) for incoming calls, generating service logic that is representative of the instruction, and implementing the service logic in conjunction with a media server within the communications network to process incoming calls.

At step 306, a request from a caller to schedule an appointment with an enterprise customer is received. In one embodiment, the media server 215 receives a request to make an appointment with an enterprise customer from a caller, wherein the request is processed in accordance with a media server in the communications network.

At step 308, scheduling calendaring data is accessed. In one embodiment, an electronic scheduling calendar is accessed and used by the media server 215 to determine available appointment time slots with the enterprise customer.

At step 310, at least one available appointment time slots is provided to the caller. In one embodiment, the media server 215 utilizes a text-to-speech application to read the calendar scheduling data and suggest open appointment openings to the caller.

At step 312, a request to reserve the appointment at one of the available time slots is received. In one embodiment, the caller responds to the media server (either using a voice command or a keypad entry) and reserves an open appointment time slot.

At step 314, the appointment at a time period requested by the caller is reserved with one of the available appointment time slots. In one embodiment, the media server 215 reserves the time slot requested by the caller if the time period is available according to the calendar schedule. The method 300 then continues to step 316 and ends.

Figure 4:
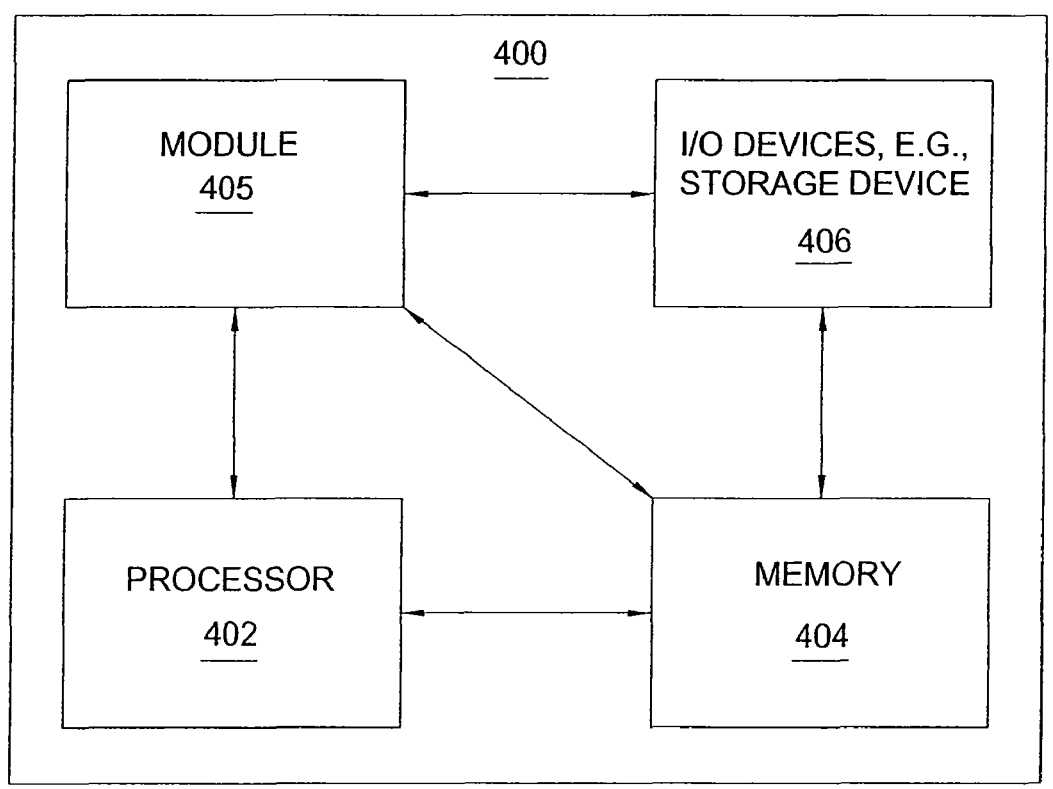
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for scheduling an appointment, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for scheduling an appointment can be loaded into memory 404 and executed by processor 402 to implement the functions as discussed above. As such, the present process 405 for scheduling an appointment (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for scheduling an appointment in a communications network, comprising:
   receiving a first request from a caller to schedule the appointment with an enterprise customer, wherein the first request is processed in accordance with a media server in the communications network;
   accessing a scheduling calendar of the enterprise customer from a plurality of scheduling calendars of different enterprise customers;
   in response to the first request, providing an available appointment time slot to the caller;
   receiving a second request to reserve the appointment at the available appointment time slot; and
   reserving the appointment.

2. The method of claim 1, wherein the communications network comprises an internet protocol network.

3. The method of claim 2, wherein the internet protocol network comprises a service over internet protocol network.

4. The method of claim 1, wherein the providing is performed using an interactive voice response application.

5. The method of claim 1, wherein the second request to reserve the appointment by the caller is reserved in response to a phone keypad signal.

6. The method of claim 1, wherein the scheduling calendar comprises an electronic calendar that is accessed by the media server.

7. The method of claim 1, wherein the scheduling calendar comprises a plurality of scheduling calendars, where each of the plurality of scheduling calendars is associated with a different entity of the enterprise customer.

8. An apparatus for scheduling an appointment in a communications network, comprising:
   a processor; and
   a computer readable medium in communication with the processor, wherein the computer readable medium has stored thereon a plurality of instructions, the plurality of instructions including instructions which, when executed by the processor, cause the processor to perform a method, comprising:
   receiving a first request from a caller to schedule the appointment with an enterprise customer, wherein the first request is processed in accordance with a media server in the communications network;
   accessing a scheduling calendar of the enterprise customer from a plurality of scheduling calendars of different enterprise customers;
   providing an available appointment time slot to the caller in response to the first request;
   receiving a second request to reserve the appointment at the available appointment time slot; and
   reserving said the appointment.

9. The apparatus of claim 8, wherein the communications network comprises an internet protocol network.

10. The apparatus of claim 9, wherein the internet protocol network comprises a service over internet protocol network.

11. The apparatus of claim 8, wherein the providing is performed using an interactive voice response application.

12. The apparatus of claim 8, wherein the second request to reserve the appointment by the caller is reserved in response to a phone keypad signal.

13. The apparatus of claim 8, wherein the scheduling calendar comprises an electronic calendar that is accessed by the media server.

14. A computer-readable medium having stored thereon a plurality of instructions, the plurality of instructions including instructions which, when executed by a processor, cause the processor to perform a method for scheduling an appointment in a communications network, comprising:
    receiving a first request from a caller to schedule the appointment with an enterprise customer, wherein the first request is processed in accordance with a media server in the communications network;
    accessing a scheduling calendar of the enterprise customer from a plurality of scheduling calendars of different enterprise customers;
    in response to the first request, providing an available appointment time slot to the caller;
    receiving a second request to reserve the appointment at the available appointment time slot; and
    reserving the appointment.

15. The computer-readable medium of claim 14, wherein the communications network comprises an internet protocol network.

16. The computer-readable medium of claim 15, wherein the internet protocol network comprises a service over internet protocol network.

17. The computer-readable medium of claim 14, wherein the providing is performed using an interactive voice response application.

18. The computer-readable medium of claim 14, wherein the second request to reserve the appointment by the caller is reserved in response to a phone keypad signal.

19. The computer-readable medium of claim 14, wherein the scheduling calendar comprises an electronic calendar that is accessed by the media server.

20. The computer-readable medium of claim 14, wherein the scheduling calendar comprises a plurality of scheduling calendars, where each of the plurality of scheduling calendars is associated with a different entity of the enterprise customer.

* * * * *